United States Patent

Pryjmak

[15] 3,675,106
[45] July 4, 1972

[54] ELECTRONIC DEMAND WINDSHIELD WIPER CONTROL

[72] Inventor: Bohdan I. Pryjmak, Kettering, Ohio
[73] Assignee: General Motors Corporation, Detroit, Mich.
[22] Filed: April 20, 1971
[21] Appl. No.: 135,562

[52] U.S. Cl. ..........................................................318/443
[51] Int. Cl. .......................................................H02k 3/08
[58] Field of Search ...............................318/443–446, 470, 318/484, 264, 272

[56] References Cited

UNITED STATES PATENTS

| | | | |
|---|---|---|---|
| 3,364,410 | 1/1968 | Foreman | 318/484 X |
| 3,492,558 | 1/1970 | Patterson, Jr. et al. | 318/443 |
| 3,581,178 | 5/1971 | Kearns | 318/443 |

Primary Examiner—Harold Broome
Assistant Examiner—W. E. Duncanson, Jr.
Attorney—W. E. Finken and W. A. Schuetz

[57] ABSTRACT

In a preferred form, this disclosure relates to an electrical control system for controlling operation of a windshield wiper unit and a washer unit for an automotive vehicle, and in which the wiper unit has a pair of oscillatable wipers which are moved through outboard and inboard strokes during each cycle of operation. The electrical control system comprises a power source, an electric motor means for driving the wipers, an electrically operated washer unit and a first control circuit means including a manual switch for effecting either low or high speed continuous operation of the wipers and a second manual switch for controlling operation of the washer unit. The electrical control system further includes a second control circuit means in parallel with a first control circuit means and which includes a transistor means connected in series with the motor means, an RC electrical time delay means connected with the base of the transistor means and a push button control switch. The control switch is operable when partially depressed to effect operation of the wiper motor through either a single cycle of operation, any number up to a predetermined number of cycles of operation or any number plus a predetermined number of cycles of operation depending upon the length of time the control switch is partially depressed prior to being released and is operable when momentarily fully depressed to effect simultaneous operation of the washer unit and the wiper unit for a predetermined number of cycles of operation and with the wiper motor shutting off automatically subsequent to the cessation of washer operation.

5 Claims, 1 Drawing Figure

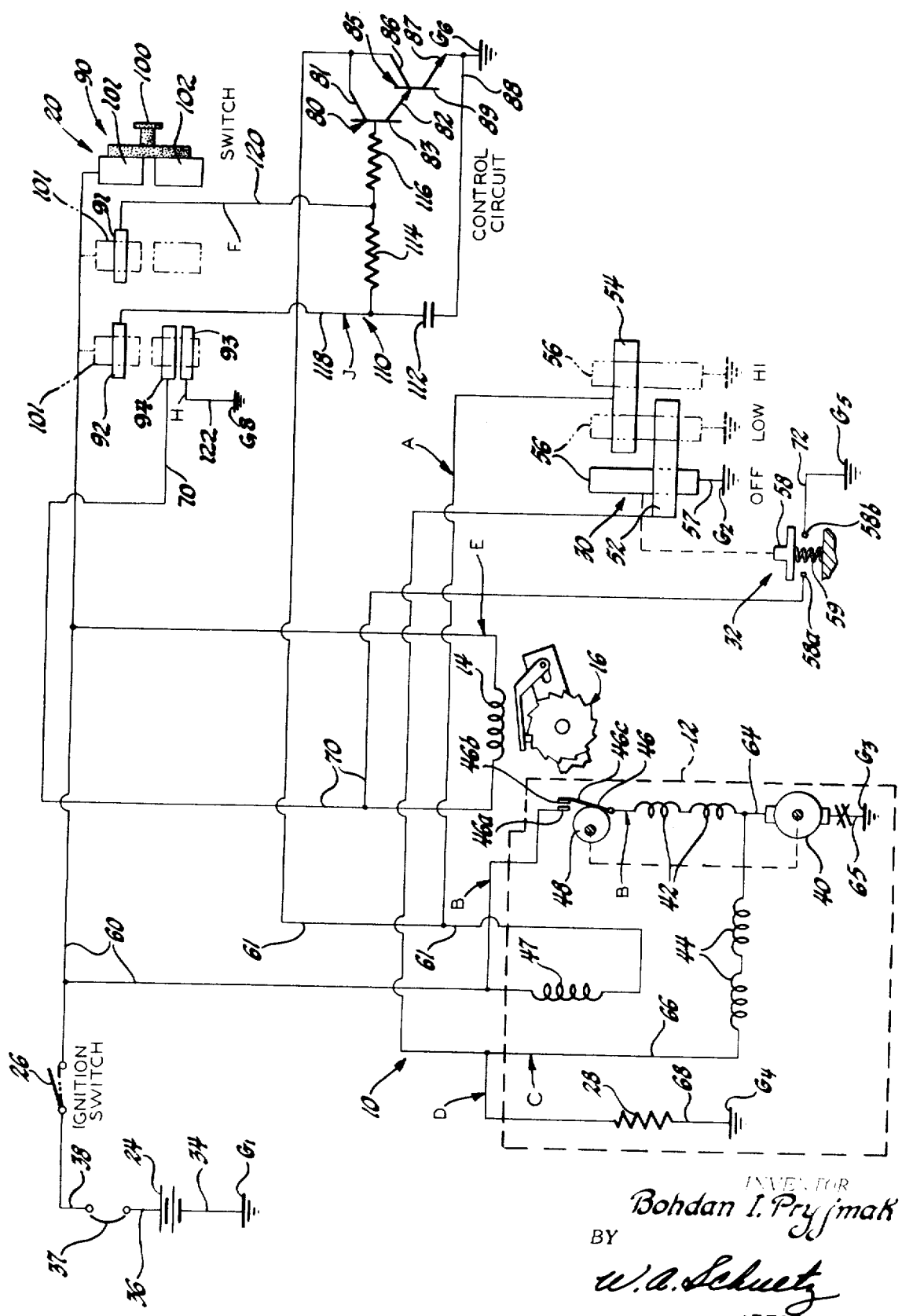

ELECTRONIC DEMAND WINDSHIELD WIPER CONTROL

The present invention relates to a control system for a windshield wiper unit and washer unit of an automotive vehicle, and in particular to an electrical control system for providing multiple modes of operation for the wiper unit.

Heretofore, electrical control systems for controlling operation of a windshield wiper unit and a washer unit for an automotive vehicle have been provided. These known systems have included a manually operable switch means for effecting either low or high speed continuous operation of a wiper motor for oscillating a pair of windshield wipers and a second manual control switch which is momentarily depressible to effect a single cycle of operation of the windshield wipers. Such a system is shown in U.S. Pat. No. 3,227,817. These known systems have also included a manually depressible switch for energizing the washer unit and simultaneously energizing the wiper unit and with the wiper unit shutting off automatically subsequent to the cessation of washer operation. In these latter systems the wiper motor is kept energized subsequent to the cessation of washer operation by a time delay means in the form of a mechanical timer, a pneumatic timer or an electrical bimetal switch timer. Examples of these latter types of systems are shown in U.S. Pat. Nos. 2,878,505, 2,743,473 and 3,068,506.

The present invention provides an electrical control system for controlling operation of the wiper and washer units of an automotive vehicle and which includes (1) a first conventional control circuit means including a first manual switch means for effecting either high or low speed continuous operation of the windshield wipers and a second manual control switch for controlling operation of the washer unit; and (2) a novel second control circuit means including a push button control switch which when partially depressed effects either a single cycle of operation, any number up to a predetermined number of cycles of operation or any number plus a predetermined number of cycles of operation of the wiper unit depending upon the length of time the push button is partially depressed prior to being released and effects, when momentarily fully depressed, a predetermined number of cycles of operation of the wiper unit and simultaneous energization of the washer unit and with the wiper unit shutting off subsequent to the cessation of washer operation.

Accordingly, an important object of the present invention is to provide a new and improved electrical control system for controlling operation of the wiper and washer units of an automotive vehicle and which includes a manually operable switch movable between an off position and first and second on positions and with the switch being biased toward its off position, and in which the control circuit means functions to energize the wiper motor for a single cycle of operation, any number up to a predetermined number of cycles of operation or any number plus a predetermined number of cycles of operation of the wiper unit depending upon the length of time the switch is moved to its first on position prior to being released and which functions to energize the washer unit and simultaneously energize the wiper unit for a predetermined number of cycles of operation upon momentary movement of the switch to its second on position and with the wiper unit shutting off automatically subsequent to the cessation of washer operation.

A further object of the present invention is to provide a new and improved electrical control system for use in controlling a windshield wiper unit of an automotive vehicle and which includes an electric motor means, a transistor means operatively connected with the electric motor means and a control circuit means including a manually manipulatable control switch in series with a power source and having an off position and first and second on positions and which is biased towards its off position, and an electrical time delay means operatively connected with the switch and the base of the transistor means and which is operable in response to momentary movement of the switch to its first on position to effect energization of the wiper motor for one or any number up to a predetermined number of cycles of operation depending upon the length of time the switch is held in the firSt on position prior to being released and which is operable to effect energization of the wiper motor through a predetermined number of cycles of operation in response to momentary movement of the switch to its second on position.

Another object of the present invention is to provide a new and improved electrical control system, as defined in the next preceding object, and in which the electrical time delay means is an RC time delay means having a capacitor operatively connected with the base of the transistor means and the switch and which discharges to keep the transistor means biased on subsequent to the control switch being released to maintain the wiper motor energized, and in which the switch when momentarily moved to its firSt on position causes the capacitor thereof to be charged at a given rate as a function of the time the switch is held in the first on position prior to being released and in which the switch when momentarily moved to its second on position causes the capacitor to be instantaneously charged whereby the wiper motor remains energized for a predetermined number of cycles of operation.

A still further object of the present invention is to provide a new and improved electrical control system, as defined in the next preceding object, and in which the control switch when moved to its second on position also effects energization of the washer unit simultaneously with energization of the wiper motor and with the length of operation of the washer unit being less than the predetermined number of cycles of operation of the wiper unit whereby the wiper unit shuts off automatically subsequent to the cessation of washer operation.

The present invention further resides in various novel constructions and arrangement of parts and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which:

The drawing schematically shows the preferred embodiment of the electrical control system for controlling operation of a wiper unit and a washer unit of the present invention.

As representing a preferred embodiment of the present invention, the drawing shows an electrical control system for controlling operation of an electric motor means of a windshield wiper unit and a relay of a windshield washer unit for an automotive vehicle. The control system broadly comprises a first control circuit means, designated generally by reference numeral 10, which is selectively operable to effect continuous operation of a d.c. unidirectional wiper motor means 12 at either low or high speed and selectively operable to effect energization of a relay 14 of a washer unit 16. The electrical control system further includes a second control means, designated generally by reference numeral 20, which is connected in parallel with a first control means and which is selectively operable to effect either a single cycle of operation of the wiper motor means 12, any number up to a predetermined number of cycles of operation or any number plus a predetermined number of cycles of operation, or to simultaneously energize the relay 14 of the washer unit 16 and the wiper motor 12 for the predetermined number of cycles of operation of the wiper motor means and with the wiper motor means 12 shutting off subsequent to the cessation of operation of the washer unit 16.

The first control circuit means 10 includes a battery 24, an ignition switch 26, the electric motor means 12, a resistor 28, a manually manipulatable wiper switch 30, the washer unit relay 14, and a manually manipulatable washer unit switch 32. The battery 24 has one terminal connected via wire or conductor 34 to ground $G_1$ and its other terminal connected via wire 36, circuit breaker 37, wire 38 to the ignition switch 26.

The electric motor means 12 comprises an armature 40, series field windings 42 connected in series with the armature 40, shunt field windings 44, the resistor 28 and a park switch 46 and its associated relay 47. The park switch 46 includes a stationary contact 46a and a movable contact 46b carried by a leaf spring 46c. The leaf spring 46c is inherently self-biased toward a closed position in which the contacts 46b and 46a engage each other, but is normally held open in opposition to its biasing force by a cam 48 eccentrically secured to the armature 40. The cam 48 is in the position shown in the drawing in which it holds the park switch 46 in its open position when the wiper motor 12 is de-energized.

The wiper unit could be of any suitable or conventional construction, but is preferably of the type shown and described in U.S. Pat. No. 3,253,206. Likewise, the washer unit 16 could be of any suitable or conventional construction, but is preferably a programmed washer unit which operates for a predetermined number of cycles of operation of the wiper unit upon its associated relay coil 14 being momentarily energized. The washer unit 16 is preferably like that shown in U.S. Pat. No. 3,503,090.

The manual control switch 30 could be of any suitable or conventional construction, but is preferably of the type which includes a wiper switch actuator which is movable between off, low and high speed positions. The washer switch 32 includes a push button washer switch actuator which can be depressed to initiate washer operation. Preferably, the wiper switch and washer switch are combined and with the washer switch 32 being depressible to initiate washer operation when the wiper switch is either in its low or high speed positions and which can be depressed to initiate washer operation and simultaneously cam the wiper switch actuator from its off position to its low speed position to simultaneously energize the wiper unit when the wiper switch is in its off position. This type of switch is shown in U.S. Pat. Nos. 2,993,098 or 3,524,952.

As schematically shown in the drawing the manually manipulatable wiper switch 30 includes a pair of stationary metal contacts 52 and 54 and a movable metal bridging member 56. The bridging member 56 is connected to a suitable ground $G_2$ via wire 57. The movable contact 56 is movable from an off position to either a low or high speed position in which it respectively bridges the stationary contacts 52 and 54 and bridges only the contact 54. The washer switch 32 includes a push button member 58 which is spring biased by a spring 59 to an off position, as shown in the drawing.

Operation of the control circuit means 10 will be described with reference to the drawing. When the operator of the vehicle desires continuous low speed operation of the wiper motor 12, he will actuate the wiper switch 30 to move the bridging member 56 from its off position to its low speed position. When the bridging member 56 is moved to its low speed position a circuit A for energizing the relay coil 47 for moving the park switch 46 to its closed position is energized. Circuit A is from battery 24, wire 36, circuit breaker 37, wire 38, ignition switch 26, wire 60, relay coil 47, wire 61, stationary contact 54, bridging member 56, wire 57 to ground $G_2$. When the relay coil 47 is energized the leaf spring member 46c of the park switch is caused to be moved in opposition to the cam 48 to its closed position in which contacts 46a and 46b engage each other. The engagement of these contacts will complete circuits B and C for energizing the wiper motor 12. The circuit B is from battery 24, wire 36, circuit breaker 37, wire 38, ignition switch 26, wire 60, now closed contacts 46a and 46b of park switch 46, series field windings 42, wire 64, armature 40, wire 65, to ground $G_3$. The circuit C is from wire 64, shunt field windings 44, wire 66, stationary contact 52, bridging member 56, wire 57, to ground $G_2$. The electric motor 40 will operate at low speed to continuously operate the wipers at low speed as long as the bridging member 56 is maintained in its low speed position.

When the operator desires high speed operation of the wiper motor 12, he will actuate the wiper switch 30 to move the bridging member 56 to its high speed position. Movement of the bridging member 56 to its high speed position completes the hereinbefore described circuit A for energizing the park switch relay 47. When the park switch relay 47 is energized the park switch 46 is moved to its closed position, which in turn completes the hereinbefore described circuit B for energizing the series field windings 42 and armature 40 of the wiper motor 12. The hereinbefore described circuit C for energizing the shunt field windings 44, however, is not energized when the bridging member 56 is in its high speed position, since the latter is no longer engaged with the stationary contact 52 and hence the ground path to $G_2$ is broken. Movement of the bridging member 56 to the high speed position, however, completes a circuit D for energizing the shunt field windings 44 through the resistor 28, which is connected to the wire 66 and connected to a ground $G_4$ via wire 68. When shunt field windings 44 are energized through the resistor 28, high speed operation of the wiper motor is effected and in a manner well known to those skilled in the art.

When the bridging contact 56 of the wiper switch is in either its low or high speed position, the washer unit 16 can be energized in response to momentary depression of the switch member 58 of the washer switch 32 to its closed position to bridge the contacts 58a and 58b. This completes a circuit E for energizing the relay coil 14 for initiating operation of the wiper unit 16. The circuit E is from battery 24, wire 36, circuit breaker 37, wire 38, ignition switch 26, wire 60, relay coil 14, wire 70, switch contact 58a, switch member 58, switch contact 58b, wire 72 to ground $G_5$. As alluded to hereinbefore, the washer unit is preferably a programmed washer unit which upon momentary energization of the relay coil 14 operates for a predetermined number of wiper strokes and then automatically shuts off.

With the bridging member 56 of the wiper switch 30 in its off position and if the operator desires simultaneous operation of the wiper and washer units, he need merely depress the push button switch 32 for the washer unit. This completes the circuit E for energizing the relay coil 14 of the washer unit 16 and simultaneously cams the movable bridging member 56 from its off position to its low speed position in which the hereinbefore described circuits A, B and C for energizing the wiper unit for low speed operation are completed. After the washer unit 16 automatically shuts off, the wiper motor 12 remains energized so long as the wiper switch 30 is in its low speed position.

In accordance with the provisions of the present invention, the electrical control system includes a second control circuit means 20 connected in parallel with the first control circuit means 10 and which is selectively operable to effect (1) a single cycle of operation of the wiper motor 12, (2) any number up to a predetermined number of cycles of operation of the wiper motor, (3) any number plus a predetermined number of cycles of operation of the wiper motor 12 or (4) to simultaneously energize the washer unit 16 and the wiper motor 12 for a predetermined number of cycles of operation of the latter and with the wiper motor 12 shutting off automatically subsequent to the cessation of washer operation.

The novel control circuit means 20 includes an NPN transistor 80 having a collector 81 connected via wire 61 to the park switch relay coil 47, an emitter 82 and a base 83 and a second NPN transistor 85 having a collector 86 connected with the park switch relay coil 47 via wire 61, an emitter 87 connected via wire 88 to a ground $G_6$ and a base 89. The transistors 80 and 85 comprise a Darlington Pair or amplifier.

The control circuit means 20 further includes a manually manipulatable push button switch 90. The switch 90 could be of any suitable or conventional construction and is schematically shown as comprising a stationary switch contact 91 and vertically aligned, but spaced from each other and from the stationary contact 91, three stationary switch contacts 92, 93 and 94. The switch 90 further comprises a plastic push button actuator 100 carrying a pair of spaced, metal bridging contacts 101 and 102. The bridging contacts 101 and 102 are movable between an off position and a partially depressed or first on position and a fully depressed or second on position. The push button actuator 100 is suitably spring biased towards its off position and is movable from its off position to either of its first or second on positions in opposition to the biasing force of the spring (not shown).

The control circuit means 20 further includes an RC electrical time delay means 110. The RC electrical time delay means comprises a capacitor 112 and a pair of resistors 114 and 116. The capacitor 112 has one side connected via wire 88 to the ground $G_6$ and its other side connected via a wire 118 to the stationary contact 93. The resistor 114 has one end connected to the wire 118 and its other end connected to a wire 120, the wire 120 in turn being connected to the stationary contact 91. The resistor 116 has one end connected to the wire 120 and its other end connected to the base 83 of the transistor 80. In the preferred embodiment, the resistor 116 has a resistance of 820,000 ohms, the resistor 114 a resistance of 1,000,000 ohms and the capacitor is a 0.9 microfarad capacitor.

The stationary contact 94 of the switch 90 is electrically connected in series with the relay coil 14 of the washer unit 16 via the wire 70 and the stationary contact 92 which is connected to a suitable ground $G_8$ via a wire 122.

Operation of the novel control circuit means 20 will be described with reference to the schematic drawing. When the operator desires only a single cycle of operation of the windshield wiper unit, he will merely momentarily depress the push button switch actuator 100 to its first on position for an instant and then release the same. When the bridging contact 101 of the switch actuator 100 is in its first on position, a circuit F is completed which partially charges the capacitor 112. This circuit is from battery 24, wire 36, circuit breaker 37, wire 38, now closed ignition switch 26, wire 60, bridging member 101, stationary contact 91, wire 120, resistor 114, wire 118, capacitor 112, wire 88, to ground $G_6$. This begins charging the capacitor 112 at a rate depending upon the value of the resistor 114. At the same time the capacitor 112 is being charged, positive voltage is applied from the wire 120 via the resistor 116 to the base 83 of the transistor 80. The application of the positive voltage to the base 83 of the transistor 80 turns on the transistor 80 to render it conductive whereby positive voltage is applied to the base of transistor 85 via wire 61, collector 81 and emitter 82, which turns on the transistor 85. The turning on of the transistor 85 energizes the park switch relay 47 via the current through wire 61, the collector 86 of the transistor 85 and the emitter 87, wire 88 tO ground $G_6$. Energization of the park switch relay 47 closes the park switch 46 which in turn completes the circuits B and C for energizing the wiper motor 12 for low speed operation.

Although the switch actuator 100 is only momentarily depressed to its first on position and then released, the capacitor 112 which will have been partially charged will discharge upon release of the switch actuator 100 to maintain a biasing voltage on the base of the transistor 80 for a sufficient length of time to make sure the relay coil 47 maintains the park switch 46 closed for enough time to enable the motor 12 to rotate the cam 48 to allow the inherent self-biasing force of the park switch 46 to maintain the same in its closed position. The motor will operate through one revolution at which time the cam 48 will again open the park switch 46 to de-energize the circuits B and C to shut off the wiper motor 12. The time period required for the motor 12 to rotate one revolution is preferably about one second during low speed operation.

The values of the resistors and capacitors are such that if the push button actuator 100 is momentarily depressed and released, for example, one-tenth of a second, the relay 47 will have been energized and the capacitor 112 charged sufficiently so that the wiper motor 12 will operate through one cycle of operation. If the push button actuator 100 is depressed and held for one second, the capacitor 112 will be fully charged and take about 5 seconds to discharge whereby the wiper motor 12 will have been energized for 6 revolutions (assuming the motor 12 makes 1 revolution each second). If the push button actuator 100 is depressed and held for varying times between one-tenth and 1 second any number of cycles of operation up to 6 cycles of operation can be achieved. If the push button is depressed for a time period longer than a second, any number, depending on how long the push button is depressed, plus 5 revolutions of the wiper motor can be obtained.

Thus, the operator can energize the wiper motor 12 through a single cycle of operation, any number of cycles of operation up to 6 depending upon the length of time between one-tenth and 1 second the push button actuator 100 is held in its first on position or any number plus 5 revolutions depending upon the length of time over a second the push button 100 is held depressed. Thus the control circuit means 20 provides for a variable demand wiping mode from one to six cycles of operation of the wiper unit or any number above 6 plus 5 additional cycles of operation.

If the operator desires to simultaneously energize the washer unit 16 and the wiper motor 12 and with the wiper motor shutting off subsequent to the cessation of washer operation, the operator will depress the push button actuator 100 to its second on position. When the push button actuator 100 is moved to its second on position, a circuit H for energizing the relay coil 14 of the washer unit 16 is completed. This circuit is from the battery 24, wire 36, circuit breaker 37, wire 38 ignition switch 26, wire 60, relay coil 14, wire 70, stationary contact 94, bridging member 102, stationary contact 92, wire 122, to ground $G_8$. The programmed washer unit 16 will be operated through its cycle of operation. At the same time a circuit J is completed from the battery 24, wire 36, circuit breaker 37, wire 38 now closed ignition switch 26, wire 60, bridging contact 101, stationary contact 93, wire 118, capacitor 112, wire 88, to ground $G_6$. This instantaneously charges the capacitor 112. As the capacitor 112 is being instantaneously charged, positive voltage is also applied to the base of the transistor 80, via wire 118, resistor 114, wire 120, resistor 116, to turn on the transistor 80, which in turn turns on the transistor 85 to effect energization of the park switch relay 47. Energization of the park switch relay 47 closes park switch 46 to effect energization of circuits B and C, which in turn energizes the wiper motor for low speed operation.

Even though the push button actuator 100 is momentarily depressed to its second on position and then immediately released, which breaks the circuit J for the park switch relay 47, the park switch relay 47 remains energized through the transistor 85. This is because the capacitor 112, which was instantaneously fully charged, will discharge through the resistors 114 and 116 to keep the transistor 80 turned on which in turn will keep the transistor 85 turned on. The length of time it takes for the capacitor 112 to discharge is substantially five revolutions of the wiper motor, which time is subsequent to the time at which the washer unit 16 will have already ceased operation. After the capacitor 112 is fully discharged, the transistors 80 and 85 are turned off. The wiper motor, however, remains energized until the park switch 46 is opened by the cam 48.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. An electrical control system for controlling operation of a windshield wiper unit having a windshield wiper which is oscillatable through an outboard and inboard stroke during each cycle of operation comprising: a power source; an electric motor means; transistor means having a collector, an emitter and a base; first circuit means in which said power source, electric motor means and transistor means are connected in series; second circuit means operatively connected with said base of said transistor and which is selectively operable to turn on said transistor to effect energization of said electric motor, said second circuit means including a control switch in series with said power source and having an off position and first and second on positions and which is biased towards its off position, and an electrical time delay means operatively connected with said control switch and said base of said transistor means and which is operable in response to movement of said switch from its off position to its first on position to effect energization of said electric motor to move said wipers through one, any number up to a predetermined number or any number plus a predetermined number of cycles of operation depending upon the length of time said switch is held in its first on position prior to being released and which is operable to effect energization of said wiper motor to effect movement of said wipers through a predetermined number of cycles of operation in response to momentary movement of said switch from its off position to its second on position.

2. An electrical control system for use in controlling operation of a windshield wiper unit having a windshield wiper which is oscillatable through an outboard and inboard stroke during each cycle of operation comprising: a power source; an electric motor means; transistor means having a collector, an emitter and a base; a first circuit means in which said power source, motor means and collector of transistor means are connected in series and with the emitter of the transistor means being connected to a ground; a control switch having first and second spaced stationary contacts, a movable contact operatively connected with the power source and an actuator for moving the contact from an off position in which it does not engage any of the stationary contacts and a first on position in which it engages the first stationary contact and a second on position in which it engages the second stationary contact and with the actuator being biased towards its off position; an RC time delay means including a capacitor connected with said second stationary contact and a ground, a first resistor having one end connected between said second stationary contact and said capacitor and its other end connected with said first stationary contact, a second resistor having one end connected with the other end of said first resistor and said first stationary contact and its other end connected with the base of the transistor means, said RC time delay means being operable in response to movement of said movable switch contact to its first on position to effect energization of said wiper motor to move the wiper through one, any number up to a predetermined number or any number plus a predetermined number of cycles of operation depending upon the length of time said switch is held in its first on position prior to being released and being operable to effect energization of the wiper motor to move said wiper through a predetermined number of cycles of operation in response to momentary movement of said switch actuator to its second on position.

3. An electrical control system for use in controlling operation of a windshield wiper unit having a windshield wiper which is oscillatable through an outboard and inboard stroke during each cycle of operation comprising: a power source; an electric motor; a parking switch for controlling energization and de-energization of the electric motor and which includes a switch member normally biased towards its closed position in which it effects energization of the wiper motor but which is held in its open position by a cam driven by the electric motor when the wipers are in their park position; a park switch relay for moving the park switch to its closed position in opposition to the cam when the park switch relay is energized; a transistor means having a collector, an emitter and a base; a first circuit means in which said power source, park switch relay and collector of said transistor means are connected in series, said emitter of said transistor being connected to a ground; and second circuit means operatively connected with said base of said transistor means for turning on said transistor to effect energization of said relay and hence said wiper motor, said second control circuit means including a control switch in series with said power source and having an off position and first and second on positions and which is biased toward its off position, and an RC time delay means operatively connected with said control switch and said base of said transistor and which is operable in response to movement of said control switch from its off position to its first on position to effect energization of said relay and hence said wiper motor to move the wiper through one, any number up to a predetermined number or any number plus a predetermined number of cycles of operation depending upon the length of time said switch is held in its first on position prior to being released, and which is operable to effect energization of the wiper motor through said predetermined of cycles of operation in response to momentary movement of said switch to its second on position, said wiper motor remaining energized subsequent to said RC time delay means effecting a turn off of said transistor means until the cam of the wiper motor cams the park switch to its open position.

4. An electrical control system as defined in claim 3 wherein said control switch comprises first and second spaced stationary contacts and a movable contact which is connected with said power source, and wherein said RC time delay means comprises a capacitor which is connected to said second stationary contact and a ground, a first resistor having one end connected between said capacitor and said second stationary contact and its other end connected with said first stationary contact and a second resistor having one end connected to said other end of said first resistor and said first stationary contact and its other end connected with the base of the transistor whereby said transistor is turned on when either the movable contact bridges the first or second stationary contact, but the capacitor is charged at a predetermined rate when the movable contact engages the first stationary contact and is instantaneously charged when the movable contact engages the second stationary contact.

5. An electrical control system for use in controlling operation of a windshield wiper and washer unit and with the wiper unit including a wiper which is oscillatable through an outboard and inboard stroke during each cycle of operation comprising: a power source; an electric motor means; transistor means having a collector, an emitter and a base; a first circuit means in which said power source, electric motor means and transistor means are connected in series; a control switch comprising first, second and third spaced stationary contact means, a movable contact means which is selectively movable between an off position and first and second on positions in which it bridges said first and said second and third stationary contact means and an actuator for moving the movable contact means between its positions and which is biased towards its off position, said movable contact means being connected with said power source, a washer unit relay for energizing the washer unit and which is connected with said third stationary contact means and a ground, an RC time delay means operatively connected with said first and second stationary contact means and with the base of the transistor means and which is operable in response to movement of said movable contact to its first on position to effect energization of the motor to move the wipers through one, any number up to a predetermined number or any number plus a predetermined number of cycles of operation depending upon the length of time said movable contact is held in the first position and which is operable to effect energization of the wiper motor through said predetermined number of cycles of operation and simultaneously effect energization of the washer unit relay in response to momentary movement of said switch actuator to its second on position and with said wiper unit automatically shutting off after said washer unit and said predetermined number of cycles of operation.

* * * * *